Sept. 25, 1951 N. J. ZAGOTTI 2,569,212

IDENTIFICATION HUB CAP

Filed July 16, 1947

INVENTOR.

Nick J. Zagotti

BY Victor J. Evans & Co.

ATTORNEYS

Patented Sept. 25, 1951 2,569,212

UNITED STATES PATENT OFFICE 2,569,212

IDENTIFICATION HUB CAP

Nick J. Zagotti, Ford City, Pa.

Application July 16, 1947, Serial No. 761,230

1 Claim. (Cl. 40—129)

This invention relates to automobile hub caps and more particularly for a means for supporting a card or plate within the same to indicate the ownership and license number of the car.

It is an object of the present invention to provide an identification card holder which can be disposed on the inside of a hub cap and protected from the elements and at the same time made easily accessible to persons desiring to learn the identification of the car and its ownership.

For other objects and a better understanding of the invention reference may be had to the following detailed description taken in connection with the accompanying drawing, in which.

Figures 1, 2, 3:
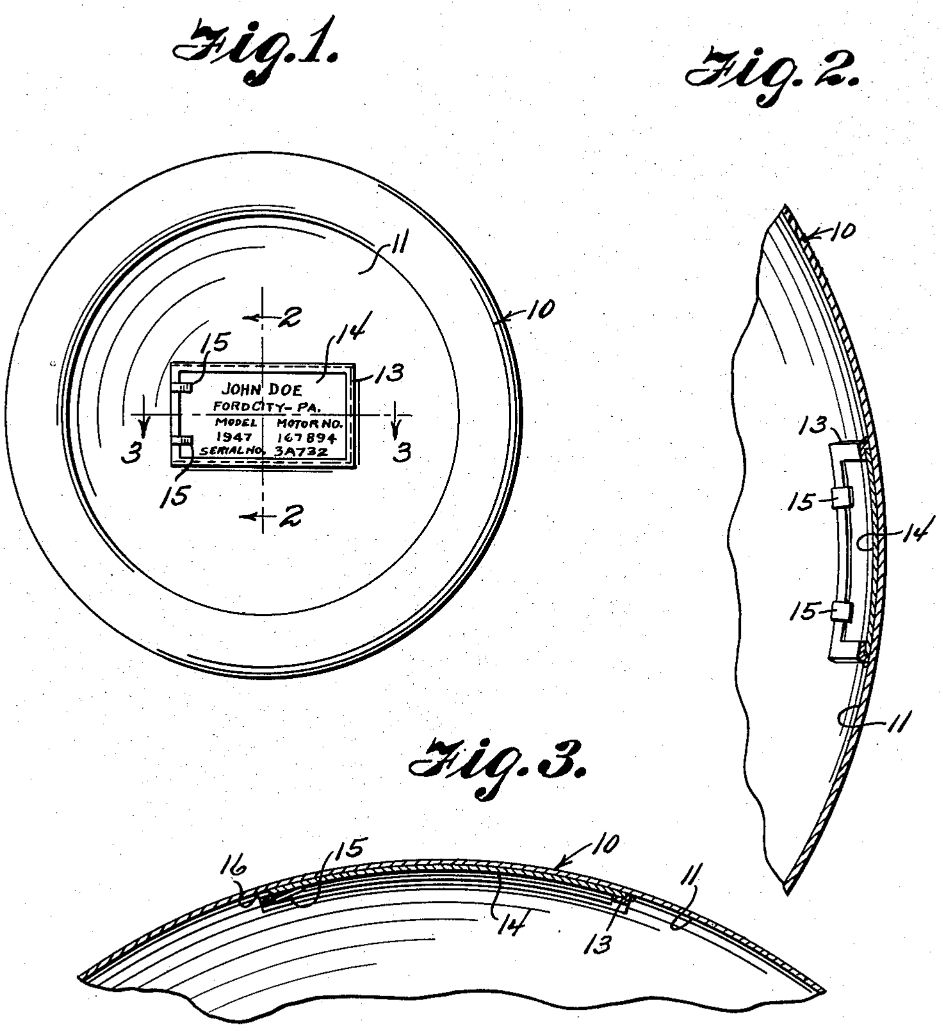
Figure 1 is an elevational view looking into the interior of a hub cap and upon the identification card and its retaining means thereupon.
Figure 2 is a cross-sectional view taken on line 2—2 of Figure 1.
Figure 3 is an enlarged cross-sectional view taken on line 3—3 of Figure 1.

Referring now to the figures, 10 represents a hub cap having an inner face 11 to which is connected a frame 13 of such dimension as to receive a card 14 bearing the identification of the automobile and other information. This information may include the make and engine number of the car, name and address of the owner, and any other identification means, and this may be typed or printed on the card 14 a duplicate of which is forwarded to some central office. The card may be removed or destroyed and still a record of the car will remain in the central office. With the information on the car placed upon the engine and in such places whereby it can be easily destroyed, it is difficult to place new identification indicia upon the car and have official notice thereof in a central office.

The frame is rectangular shape having side and end members and a continuous groove is provided around the inner edges of the members with an opening through one of the members providing means for inserting a card therein.

The ordinary embossed identification plate which ordinarily has to be soldered or spot welded to the car can be dispensed with. The present holder is welded or secured to the inner face of the hub cap and is adapted to retain the identification card 14. The card can be slid into the frame 13 from one end and will be retained against removal from either the end or from the top by spring clips 15 bearing against the front of the card. The opening in the frame will be at the location of the spring clips as at 16.

While various changes may be made in the detailed construction and arrangement, it shall be understood that such changes shall be within the spirit and scope of the present invention as defined by the appended claim.

I claim:

In a hub cap identification device, the combination which comprises a motor vehicle hub cap having an arcuate outer wall, a rectangular-shape frame having side and end bars positioned against the inner surface of the outer wall of the hub cap, with longitudinally disposed grooves in the inner edges and rear surfaces of the side bars, with the bar in one end of the frame rectangular shape in cross section and having spaced inwardly extended spring clips thereon for resiliently urging a card in the frame the edges of which are positioned in the grooves of the side bars against the inner surface of the arcuate outer wall of the hub cap, and with the end bar in the opposite end of the frame having a card receiving recess in the under surface thereof through which a card may be inserted and removed in and from the frame.

NICK J. ZAGOTTI.

REFERENCES CITED

The following references are of record in the file of this patent:

UNITED STATES PATENTS

| Number | Name | Date |
|---|---|---|
| 1,500,884 | Murnin | July 8, 1924 |
| 1,573,447 | Prewitt | Feb. 16, 1926 |
| 1,632,504 | Preston | June 14, 1927 |
| 1,773,480 | Flint | Aug. 19, 1930 |
| 2,014,058 | Tona | Sept. 10, 1935 |